(12) United States Patent
Dickinson et al.

(10) Patent No.: US 6,375,226 B1
(45) Date of Patent: Apr. 23, 2002

(54) PIPE CONNECTOR HAVING MECHANICAL AND FUSION CONNECTIONS

(75) Inventors: Alan John Dickinson, Nottingham (GB); Jyri Jaakko Jarvenkyla, Hollola (FI)

(73) Assignee: Uponor Innovation AB, Amsterdam (NL)

( * ) Notice: Subject to any disclaimer, the term of this patent is extended or adjusted under 35 U.S.C. 154(b) by 0 days.

(21) Appl. No.: 09/308,419
(22) PCT Filed: Nov. 20, 1997
(86) PCT No.: PCT/GB97/03110
 § 371 Date: Aug. 23, 1999
 § 102(e) Date: Aug. 23, 1999
(87) PCT Pub. No.: WO98/22744
 PCT Pub. Date: May 28, 1998

(30) Foreign Application Priority Data

Nov. 20, 1996 (GB) .............................................. 9624102

(51) Int. Cl.⁷ ............................ F16L 47/02; F16L 47/00
(52) U.S. Cl. ........................ 285/21.2; 285/55; 285/222.1
(58) Field of Search ............................ 285/21.1, 21.2, 285/104, 105, 222.1, 55

(56) References Cited

U.S. PATENT DOCUMENTS

| | | | | |
|---|---|---|---|---|
| 5,364,130 A | * | 11/1994 | Thalmann | 285/21.2 |
| 5,951,058 A | * | 9/1999 | Dickinson | 285/21.2 |
| 6,016,849 A | * | 1/2000 | Harget et al. | 138/141 |

FOREIGN PATENT DOCUMENTS

| | | | |
|---|---|---|---|
| DE | 33 06 832 A1 | 8/1984 | |
| DE | 44 44 097 A1 | 6/1996 | |
| EP | 0 038 051 | 10/1981 | |
| EP | 0 253 966 | 1/1988 | |
| EP | 0 535 247 A1 | 4/1993 | |
| EP | 0 736 719 A1 | 10/1996 | |
| GB | 588 748 | 6/1947 | |
| GB | 599 993 | 3/1948 | |
| GB | 1 007 859 | 10/1965 | |
| GB | 1 026 512 | 4/1966 | |
| GB | 1 313 242 | 4/1973 | |
| GB | 1 457 354 | 12/1976 | |
| GB | 1 480 061 | 7/1977 | |
| GB | 2 088 506 A | 6/1982 | |
| GB | 2 244 179 A | 11/1991 | |
| GB | 2 280 145 A | 1/1995 | |
| JP | 2-305517 | * 1/1990 | ............... 285/21 |
| JP | 4-171392 | * 6/1992 | ............... 285/21 |
| JP | 4-258594 | * 9/1992 | |
| JP | 5-203092 | * 8/1993 | |
| JP | 8-135875 | * 5/1996 | |
| WO | 97/06380 | 2/1997 | |
| WO | 97/21950 | 6/1997 | |

* cited by examiner

*Primary Examiner*—Eric K. Nicholson
(74) *Attorney, Agent, or Firm*—Fish & Richardson P.C.

(57) ABSTRACT

A pipe connector (1) for a multi-layer composite pipe, the pipe comprising at least one reinforcing layer (13, 14), or layer of high axial strength, at least one inner thermoplastic layer (9, 10) and at least one outer protective layer (15, 16), the connector comprising: (i) a hollow, tubular enclosure (2) adapted to receive the pipe; (ii) fusion means adapted to make a fusion connection with the inner thermoplastic layer of the pipe; (iii) mechanical gripping means (7) adapted to grip the reinforcing layer, or layer of high axial strength of the pipe; and (iv) optionally sealing means (6) adapted to form an environmental seal with the outer protective layer of the pipe, the electrofusion means (8), mechanical gripping means and optional sealing means being disposed within the enclosure and the enclosure being adapted, in use, to apply a constraining force to the mechanical gripping means and the sealing means.

34 Claims, 6 Drawing Sheets

PIPE CONNECTOR HAVING MECHANICAL AND FUSION CONNECTIONS

This invention relates to a pipe joint for a multi-layer composite pipe, and method of forming same.

Plastic pipes are used increasingly in the transportation of gases and liquids, including oils and chemicals, which are under a high pressure within the pipe. Whilst techniques, such as orientation and cross-linking exist to improve the pressure resistance of a exist to improve the pressure resistance of a normal thermoplastic pipe wall, it technically and economically difficult to raise the pressure resistance of the pipe higher than around 15 to 20 bars.

Accordingly, multi-layer composite pipes comprising, for example, a thermoplastic inner layer and, outside it, a reinforcing layer, or a high axial strength inner layer and an outer protective layer, have been proposed for use as high pressure pipes.

Normally the reinforcing layer consists of fibres wound helically around the thermoplastic inner layer. The fibres may be bundled in tape form and the tape matrix fused to the thermoplastic inner layer by the use of heat, for example, as described in EP 0 593 449. The reinforcing layer can also be a conductive layer, for example a metal layer, which is spirally wound or seam welded on top of the thermoplastic layer in order to form a reinforcing metal layer of about 0.2 mm to 5 mm thickness over the thermoplastic layer. The reinforcing layer is preferably covered with another protective thermoplastic layer, which may contain, for example, pigments, antioxidants, fillers, and other modifying components.

Such reinforced multi-layer composite pipes are described, for example, in International Patent Application No PCT/FI96/00359, the entire disclosure of which is incorporated herein by reference for all purposes.

In order to form a firm bond between the reinforcing layer and the inner and outer thermoplastic layers, it is components, which can lose the adhesion-promoting ability if they are in contact with certain liquids, including water. Where the reinforcing layer is a metal layer, this must also be protected from any gases or liquids in the pipe, and from the environment, in order to avoid corrosion problems.

The gas or liquid flowing inside the pipe, and environmental moisture from outside the pipe, cannot normally come into contact with the reinforcing layer or the adhesive components due to the presence of the inner thermoplastic layer and the outer protective thermoplastic layer which together cover the reinforcing layer. However, at the ends of the pipe the continuity of the inner layer and the outer protective layer is disrupted, and therefore pipe connections need to be made in such a way that the reinforcing layer does not come into contact with either the gases or liquids within the pipe, or the outer environmental conditions.

Many solutions to the above problem have been proposed, but all have their drawbacks.

WO92/21908 discloses a pipe connection in which the reinforcing layer becomes thinner over a long surface towards the end of the pipe, and ends a distance from the end of the thermoplastic layer, where an extension is formed. An adaptor is fitted inside the extension, and outside the end of the thermoplastic layer the adaptor is attached, by means of threads, to a steel pipe surrounding the end of the pipe. The adaptor has a conical surface which presses the thermoplastic layer against the inner surface of the outside steel pipe.

The disadvantage of this known pipe connection is that liquid, especially from the outside, but also from the inside of the pipe, can relatively easily enter the end of the reinforcing layer, which, due to a small conical angle, is very large and which thus comprises a great amount of adhesive on the surface of the pipe. A high-pressure liquid flowing inside the pipe can get to the end of the reinforcing layer by going around the end of the thermoplastic layer which is fixed between the adaptor and the steel pipe with compressive forces provided by threads.

In this known solution, the extension at the end of the pipe is formed in a usual manner, ie the extension has a conical surface to which a cylindrical part restricted to the end of the pipe is connected. Such an extension cannot be formed to the part of the pipe which has the reinforcing layer, since due to its characteristics the reinforcing layer does not allow the diameter to increase. Therefore it has been necessary to make the reinforcing layer thinner and to end it before the extension, which thus consists of only the thermoplastic layer. The pipe connection becomes then rather long, and the fitting conical surfaces of the extension and that adaptor, which are the best sealing surfaces of the connection, have a relatively small surface area.

Another solution is provided in European Patent Application No 95 10 4955 in which the ends of composite plastic pipes to be connected are each provided with an extension, and a ring-shaped connecting piece is situated inside the pipes at the extended ends thereof, the connecting piece and the extensions of the pipes to be connected having fitting substantially conical surfaces which extend substantially to the ends of the pipes and from which the connecting piece and the extension are welded together. This system works well with glass fibre reinforced pipes, but is difficult to apply when the reinforcing layer is a metal layer, since it is difficult to form the conical extension without splitting the metal reinforcing layer.

A still further pipe connector is disclosed in DE 44 44 097 which shows an electrofusion coupler which is provided with an annular sealing means to seal the cut ends of the composite pipes. However, in this case, the connection is made only between the thin outer protective thermoplastic layers of the pipes to be connected, and there is no connection between the reinforcing layers. The pipe connection therefore represents a weak point in the pipeline, and is vulnerable to internal pressure and axially, applied forces.

EP-A-0253966 discloses a coupler for a pipe comprising an electrofusion coil and mechanical gripping means, the gripping means being arranged to grip the pipe prior to and during fusion, the fusion joint thereafter providing the effective joint for the pipe.

The entire disclosures of all the abovementioned patents are incorporated herein by reference for all purposes.

In one aspect the present invention provides a joint between a pipe connector and a multi-layer composite pipe, wherein a direct mechanical connection is made to the reinforcing layer, or to the layer of high axial strength, thereby giving a pipe connection of enhanced mechanical strength.

In another aspect, the invention further provides, at least in certain preferred embodiments described herein, a joint between a pipe connector and a multi-layer composite pipe which can:

(i) provide a seal against internal fluids flowing in the pipe;

(ii) provide axial strength, preferably to the level of the pipe itself; and (iii) provide an environmental seal to prevent contaminants such as dirt from entering the sealing region.

In a further aspect, at least in certain preferred embodiments described herein, the joint of the invention provides a connection to both the inner thermoplastic layer and the reinforcing layer of a multi-layer composite pipe, further improving the quality of the connection.

In a first aspect, the invention provides a joint between an end of a pipe and a connector, wherein the pipe comprises a multi-layer composite pipe having at least one reinforcing layer, or layer of high axial strength, at least one inner thermoplastic layer, and at least one outer protective layer, and wherein the connector comprises:

(i) a hollow, tubular enclosure adapted to receive the pipe;

(ii) fusion means adapted to make a fusion connection with the inner thermoplastic layer of the pipe; and (iii) mechanical gripping means adapted to grip the reinforcing layer or hugh axial strength layer of the pipe;

the fusion means and mechanical gripping means being disposed within the enclosure and the enclosure being adapted, in use, to apply a constraining forge to the mechanical gripping means, characterised in that the thermoplastic layer extends beyond the end of the protective layer, in that the fusion means and mechanical gripping means are axially spaced within the connector, and in that the axial strength of the joint is provided more by the mechanical gripping means than said fusion connection.

Preferably the connector further comprises sealing means disposed within the enclosure and adapted to form an environmental seal with the outer protective layer of the pipe, the enclosure being adapted, in use, to apply a constraining force to the sealing means.

In a second aspect, the invention provides a method of forming a connection to a multilayer composite pipe, the pipe comprising at least one reinforcing layer, or layer of high axial strength, at least one inner thermoplastic layer and at least one outer protective layer, wherein at least the outer protective layer of the composite pipe is cut back in order that circumferential surfaces of the inner thermoplastic layer, and the reinforcing layer, or high axial strength layer, are exposed for connection by a connector comprising:

(i) a hollow, tubular enclosure adapted to receive the pipe;

(ii) fusion means adapted to make a fusion connection with the inner thermoplastic layer of the pipe; and, (iii) axially spaced from the fusion means, mechanical gripping means adapted to grip the reinforcing layer of the pipe;

the fusion means and mechanical gripping means being disposed within the enclosure and the enclosure being adapted, in use, to apply a constraining forte to the mechanical gripping means, the axial strength of the joint being provided more by the mechanical gripping means than said fusion connection.

Preferably the fusion means, mechanical gripping means and sealing means are disposed in recesses in the tubular enclosure such that the sealing means is nearest to the and of the tubular enclosure, followed by the mechanical gripping means, and then the fusion means.

The hollow, tubular enclosure can comprise a plastics or a metal body, or may be a composite construction, with plastics and reinforcement layers. The reinforcement can, for example, comprise a sleeve or grid formed from metallic materials, or it can comprise reinforcing fibres. In manufacturing a hollow, tubular enclosure reinforced with fibres, the reinforcing fibres can be wound on a preform and later provided with a plastics outer skin. Alternatively, the fibre reinforcement can comprise a three dimensional preform, which maintains its shape, and comprises fused plastics coated fibres. The preform can be set into a mould cavity and the spaces or interstices in the preform filled with a plastics matrix material by, for example, injection moulding, to give an oriented hollow, tubular enclosure as described in PCT/EP96/02801.

The tubular enclosure may also comprise a recoverable material, and, for example, the tubular enclosure may be formed from an expanded cross-linked polymeric material which is "held-out" on a removable core or supporting device. The tubular enclosure can be an integral body, or can be composed of two or more hollow members which are threaded, in order that they can be screwed together, or which have co-operating annular projections or depressions enabling them to be a snap-fit together.

In preferred embodiments, the action of screwing or pushing the component members of the tubular enclosure together acts to apply, or to increase, the constraining force in the mechanical gripping means and the sealing means. For example, the component members of the tubular enclosure can have co-operating conical surfaces which are forced together in a ramp or wedging action in order to apply radially inwardly directed forces on the mechanical gripping means and the sealing means. In these embodiments, it will be apparent that the walls of the tubular enclosure would need to be, at least to a small sextant, inwardly deformable.

In certain embodiments, the positions of the sealing means and the mechanical gripping means can be interchanged so that the mechanical gripping means is nearest to the end of the tubular enclosure, for example, where the tubular enclosure is provided with axial slits at its end section to facilitate inward deformation.

The fusion means can comprise a connector whereby a pipe is fused or "welded" to another component by the action of heat. Any suitable fusion means may be used, although electrofusion means comprising an electrical heating element which may be a resistance or an induction heating element is preferred. The electrofusion means can, for example, comprise a fitting comprising an electrical conductor element, for example, a metal coil, ring, serpentine ring, expanded mesh, or other suitably shaped member, which is located adjacent to, or embedded in, a layer of fusible thermoplastic polymeric materials. The electrical conductor element may be energised, for example, by passage of an electric current therethrough, or by inductive heating, in order to melt the adjacent thermoplastic material and form a fusion bond with the outer surface of the inner thermoplastic layer of the composite pipe. The invention is not restricted to the use of electrofusion means, however, and for example other fusion techniques such as friction welding of components or the use of pre-heated tools inside the connector, may be used as appropriate.

The fusible thermoplastic polymeric materials of the electrofusion means can comprise, for example, a polyolefin, for example, polyethylene, polypropylene, polybutylene, and higher olefinic polymers; co-polymers of ethylene, propylene and butylene with each other and with olefinically unsaturated monomers; olefinically unsaturated aromatic polymers such as polystyrene and styrene copolymers; and polymers and co-polymers of vinyl monomers such as ethylene vinyl acetate co-polymers, polycarbonates, and like materials. Polyethylene is the preferred fusible polymeric material particularly where polyethylene pipes are to be joined. If desired, the fusible thermoplastic polymeric material can comprise a modified polyolefin material, for example, an anhydride modified polyethylene, or the material can comprise a cross-linking agent which reacts during or after the fusion bonding step to cross-link the polymeric material and possibly the adjacent surface of the pipe, Modified polyolefins are particularly useful in joining polyolefin surfaces of dissimilar composition. Suitable modified polyolefin materials include, for example, alpha olefin polymers and co-polymers comprising up or 10% by weight of an olefinically unsaturated carboxylic acid or an anhydride thereof, such as, for example, acrylic acid. maleic acid, itaconic acid, and succinic acid, or their anhydrides, as co-polymer or graft co-polymer components.

If desired, the fusible thermoplastic polymeric material can comprise one or more fillers, and, for example, it can comprise fillers which react and can reach high temperatures when exposed to infra-red radiation or electromagnetic radiation, for example, stainless steel fibres, as described in PCT/EP96/02801. The use of such fillers to assist, or instead of, the fusion means described above is included within the invention.

The mechanical gripping means can, for example, comprise a series of two or more toothed segments which are radially disposed around the connector and are capable, in use, of contacting and gripping the reinforcing layer of the composite pipe. The mechanical gripping means are preferably formed from a hard, metallic material or from an engineering plastics material such as an acetal resin. The teeth of the mechanical gripping means can, if desired, be sharp enough to penetrate the outer protective layer and/or the reinforcing layer of the composite pipe, in order to improve the connection thereto. Where more than one reinforcing layer is present in the multi-layer composite pipe, the gripping means preferably contacts and gripe the innermost reinforcing layer. The segmented gripping means can, if desired, be provided with a frusto-conical outer surface which is co-operable with a frusto-conical inner surface of the tubular enclosure to improve the gripping action and resist axial pull-out.

Other forms of mechanical gripping means can be envisaged, for example, the teeth could be replaced by roughened surfaces, or the gripping means could comprise a resilient split ring, or similar component. In certain types of multi-layer, composite pipes, for example, as described in PCT/FI96/00359, the surface of the reinforcing layer may not be smooth, and this roughness or undulation can assist the gripping action of the gripping means.

In a further embodiment, the mechanical gripping means can comprise a ring or a series of arcuate segments, provided with helical threads which can be screwed on to the reinforcing layer of the pipe and form co-operating threads thereon. This can be readily accomplished where the reinforcing layer comprises, for example, an aluminium layer. The use of threaded mechanical gripping means provides the further advantage that, with appropriate design, it may be possible to re-enter the joint by rotating the tubular enclosure. It may also be possible to pre-assemble a pipeline, with a number of joints, before installing the pipeline in a trench and before fusion, because the threaded mechanical gripping means would provide sufficient axial strength for the installation. If adjustments to the pipeline need to be carried out, these can be done before fusion. The final fusion step can then be accomplished in the trench with the pipeline in the desired position. Simple removal of an installed joint would also be possible by heating the fusion area to the melt temperature and rotating the tubular enclosure.

Any suitable sealing means may be provided to form an environmental seal between the outer protective layer of the pipe and the hollow, tubular enclosure of the pipe connector. Preferably, however, the sealing means comprises one or more sealing rings, for example, gaskets or O-rings, which may be located in one or more recesses in the inner surface of the tubular enclosure. The sizes of the O-ring and any recess in the enclosure are arranged to be such that, in use, the enclosure applies a constraining force on the O-ring in order to force it into sealing contact with the outer surface of the outer protective layer of the composite pipe.

An advantage of the present invention is that it is not necessary to form an environmental seal to the outer protective layer of the pipe by electrofusion means. This enables certain embodiments of a pipe connector of the invention to be used to connect a multi-layer composite pipe having a soft outer protective layer, for example, as described in International Patent Application No PCT/EP96/02801 and in Finnish Application No 955960, the entire disclosures of which are incorporated herein by reference for all purposes, which would not be possible with a conventional electrofusion coupler.

Other types of sealing means may also be used. For example, if the outer protective layer of the plastics pipe is relatively soft, the use of an O-ring may, in some instances, give rise to an unacceptable level of creep. In such cases, the O-ring could be replaced by an annular ring of a relatively soft viscous sealing material such as, for example, a mastic, or by an adhesive elastomeric sealant, or a hot melt adhesive. Where a sealing material having significant room temperature tack is used, the recess in the inner surface of the tubular enclosure is preferably of such a size that the sealing material is not brought into contact with the outer layer of the pipe until a constraining force is applied. Where the sealing material is heat activatable, the necessary heat may be supplied by exterior heating or by the heat generated by the fusion means.

The pipe connector of the present invention may be provided as an assembly, into which a prepared end of the composite pipe is simply inserted, or may be provided as two or more separate components which are individually installed. For example, the fusion means can be integral with the tubular enclosure, or provided as a separate component. By installing the component separately they can be individually inspected to ensure that, for example, the fusion joint has been correctly formed, before the tubular enclosure is installed over the other components of the connector. Preferably the axial strength of the tubular enclosure is greater than the axial strength of the fusion means, in order the tensile forces are transferred from the fusion joint to the tubular enclosure.

In many cases it is desirable that the pipe connector should provide electrical continuity across the connection, especially between the reinforcing metal layers of two composite pipes to be connected. Such composite pipes are described in International Patent Application No PCT/FI96/00359 mentioned hitherto. The pipe connector of the present invention provides a particularly simple way of maintaining electrical continuity, and this is a preferred and further aspect of the invention. Electrical continuity can be provided, for example, by connecting the ends of the electrofusion coil, either before or after fusion, to adjacent ends of the metal reinforcing layer. An electrofusion oil can, for example, be provided with terminal which may he connected, either directly, or through the mechanical gripping means, to the reinforcing metal layers. In a preferred embodiment, the ends of the electrofusion coil are each provided with a terminal which is received in a socket in an adjacent segment of the mechanical gripping means Electrical continuity is thereby provided through the mechanical gripping means which is capable of penetrating and piercing any oxide layer on the reinforcing metal layer, and thence through the electrofusion coil to the metal layer on the composite pipe to be connected. Other methods of providing electrical continuity can also be provided, for example, the mechanical gripping means could be directly connected over the fusion means or via the tubular enclosure if the enclosure if formed from a conductive material In preparing the multi-layer composite pipe for connection, the outer protective layer and the reinforcing layer, where present, are preferably each cut back in order that circumferential surfaces of the inner thermoplastic layer, and the reinforcing layer are exposed for connection. Preferably the lengths of the inner thermoplastic layer and the reinforcing layer thereby exposed are from 20 to 200% of OD, where OD is the outer diameter of the pipe.

In preparing the reinforcing layer for connection, in some embodiments it may be desirable to form an upstanding projection at the out back edge of the reinforcing layer for extra strength, or to provide easier electrical connection. Whilst the invention will normally be applied to multi-layer composite pipes in which the reinforcing layer is flat, it will be apparent that it would equally be possible to form a connection with pipes in which the reinforcing layer is corrugated.

In a still further embodiment, it may be possible, in preparing the pipe end for connection, to turn over the inner thermoplastic layer so that it lies on top of and overlaps the reinforcing layer for a short distance at the end of the pipe. This may make electrofusion easier since the inner thermoplastic layer would then be doubled in thickness and also supported by the reinforcing layer, and could enhance the gripping effectiveness of the mechanical gripping means.

Whilst it would normally be preferred to cut back the outer protective layer in order to expose the reinforcing layer to the mechanical gripping means, this is not essential, and, for example, it may be possible to use a gripping means having sharpened teeth which could penetrate the outer protective layer in order to make contact with and grip the reinforcing layer through the protective layer.

The multi-layer, composite pipe of the invention has been mostly described hitherto with reference to at least three distinct layers; the outer protective layer, the reinforcing layer or layer of high axial strength, and the inner thermoplastic layer it will be apparent, however, that in certain embodiments, two or more layers of the pipe can be combined, and/or one of the layers can have a dual function. For example, the invention also includes a connector for joining a multi-layer pipe wherein the functions of the inner thermoplastic layer and the reinforcing layer or layer of high axial strength of the pipe are fulfilled by a single thermoplastic layer which is, for example, cross-linked and/or oriented in the axial direction to give a very high axial strength. In such a pipe, preparation merely comprises stripping back the outer protective layer to expose the cross-linked and/or oriented inner layer for fusion and, if necessary, for mechanical connection to the gripping means, if this is not able to penetrate the outer protective layer. An example of a pipe which can be connected in this way is a cross-linked, axially oriented, polyethylene (PEXO) pipe, with an outer protective layer having an axial strength less than that of the cross-linked, oriented polyethylene layer. The connection of such pipes is expressly included within the invention.

The pipe connection of the invention can, for example, be sued in an in-line coupler, for connecting two similar pipes in line, a bend, for connecting two similar pipes arranged at an angle, a transition coupler, for connecting pipes of different diameters, or in a fitting for connecting a multi-layer composite pipe to other fittings or pipes, wherein the fitting is provided, at its end remote from the connector of the invention, with other connecting means, for example, a screw-threaded end, a conventional electrofusion means, a butt fusion end, a flanged end or similar connecting means.

Embodiment of the invention will now be described, by way of example only, with reference to the accompanying Drawings in which.

Figure 7:
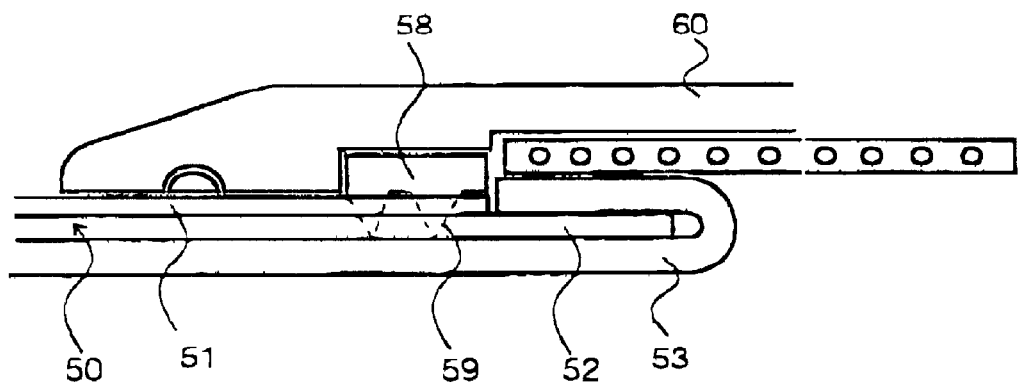
Figure 8:
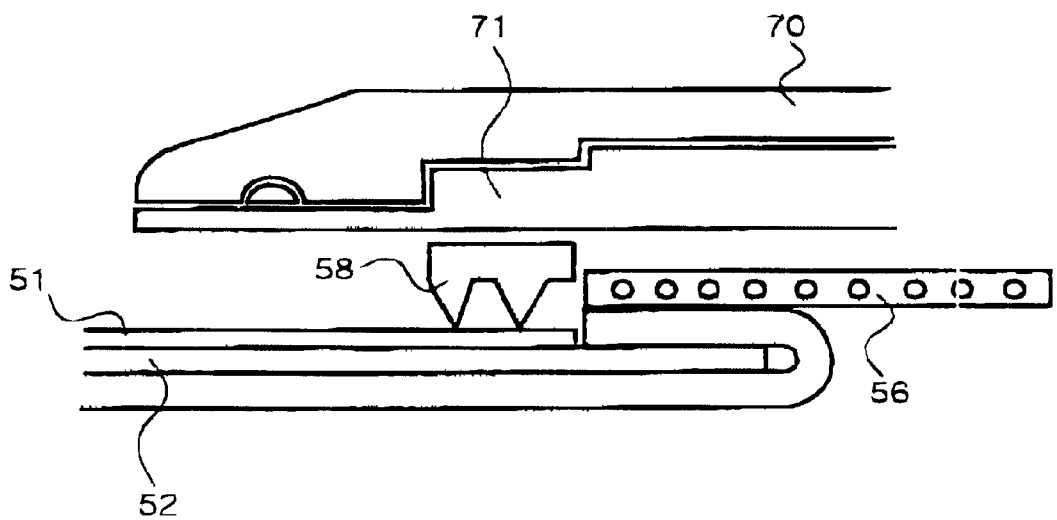
Figure 9:
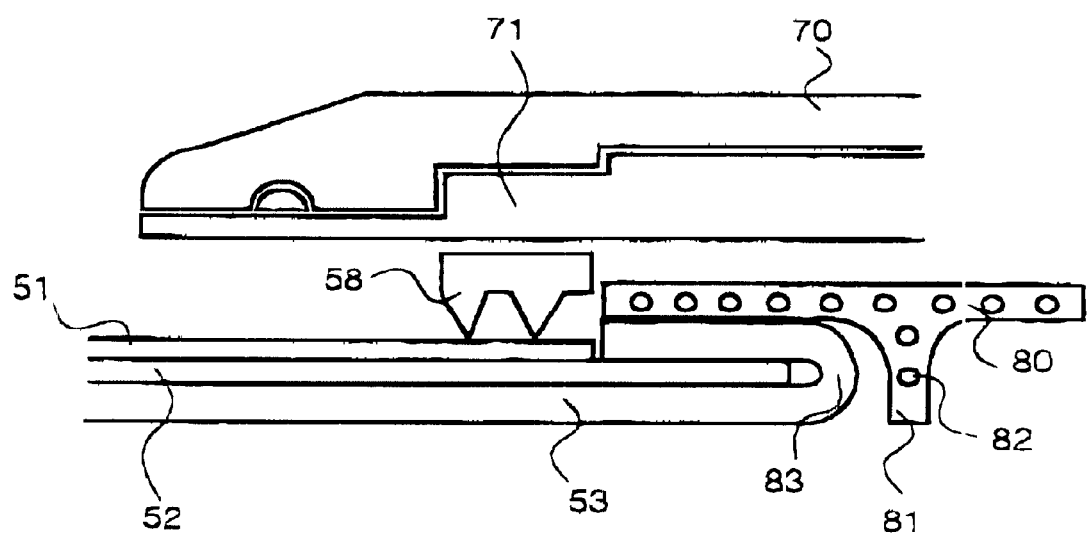

FIG. 7 shows a still further embodiment of a pipe connector according to the invention, in part sectional side elevation, wherein the inner thermoplastic layer of the composite pipe has been turned over in order to lie on top of the reinforcing layer and the mechanical gripping means is provided with teeth which pierce the outer protective layer of the composite pipe; and FIGS. 8 and 9 show variations on the pipe connector of FIG. 7, wherein the tubular enclosure is formed from an expanded cross-linked polymeric material.

Figure 1:
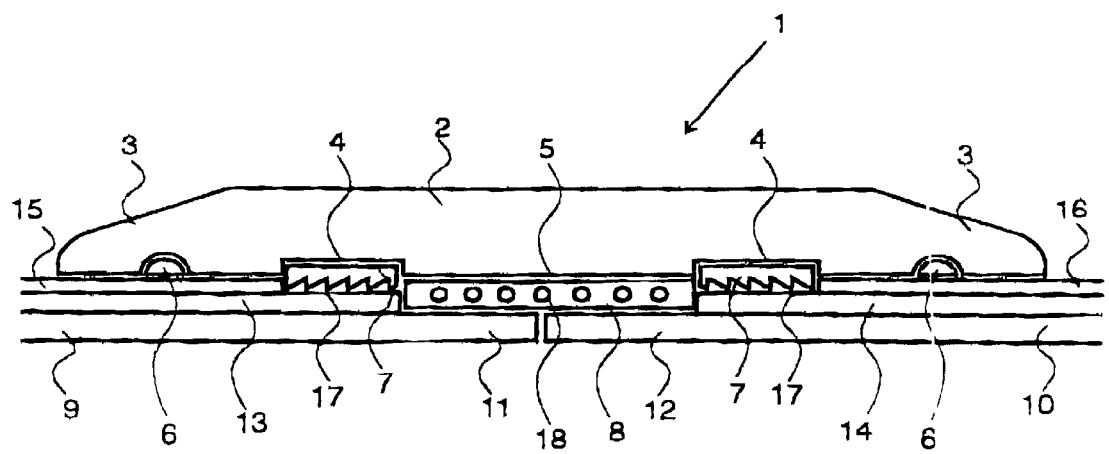
FIG. 1 shows a first embodiment of an installed pipe connector according to the present invention in part sectional side elevation.

Referring now to FIG. 1, the pipe connector illustrated generally at 1 comprises a tubular enclosure body 2. having annular recesses 3, 4 and 5 for receiving respectively O-rings 6, segmented mechanical gripper rings 7, and an electrofusion coupler 8.

In order to be received in the pipe connector, the ends of the pipes 9, 10 have been cut back in order to expose sections of the inner thermoplastic layers 11, 12 and the reinforcing layers 13, 14.

As illustrated, the pipe connector is pre-assembled, and then placed over the pipe ends. The dimensions of the tubular enclosure are such that, when the ends of the pipes 9, 10 are pushed into the pipe connector 1 the enclosure 2 presses the sealing rings 6 into sealing engagement with the outer surfaces of the pipe outer protective layers 15, 16, and presses the segments of the mechanical gripper rings 7 into contact with the metal layers 13, 14. The teeth 17 of the gripper rings; 7 press into the metal reinforcing layers 13, 14 and provide a firm anchorage thereto.

The connection, is completed by energizing the electrofusion coil 18 of the electrofusion coupler 8 in order to fuse the adjacent thermoplastic material, and the outer surfaces of the inner thermoplastic layers 11 rind 12, to make a fusion bond.

Preferably the axial strength of the tubular enclosure body 2 is greater than that of the electrofusion coupler 8 in order to shift any tensile stresses away from the electrofusion bond.

It can readily be seen that gases and liquids from the interior of the pipe are prevented from reaching the reinforcing layer by the sealing action of the fusion coupler 8, which of course also adds to the mechanical strength of the joint. The connector 1 directly grips onto the reinforcing layers 13, 14, by means of the gripper rings 7. Water and other contaminants are prevented from reaching the reinforcing layer, or entering the recesses 4, by means of the sealing rings 6 which are pressed firmly against the outer surfaces of the outer protective layers 15, 16 by the body 2 of the tubular enclosure.

Figure 2:
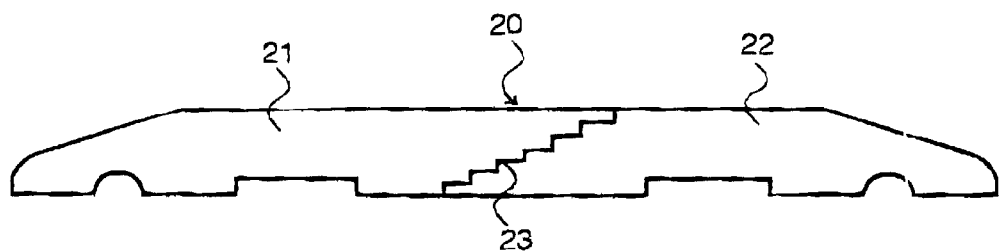
FIG. 2 shows, in part sectional side elevation, a first hollow, tubular enclosure for use in a pipe connector according to the invention.

FIG. 2 shows one embodiment of a hollow, tubular enclosure body member 20, which comprises two sections 21 and 22, which are joined by a snap-fit connection 23.

In use, the electrofusion means is first installed, and then the sections 21 and 22, embracing the pre-installed mechanical gripping means and sealing means, are pushed laterally towards each other until the snap-fit connection is made.

Figure 3:
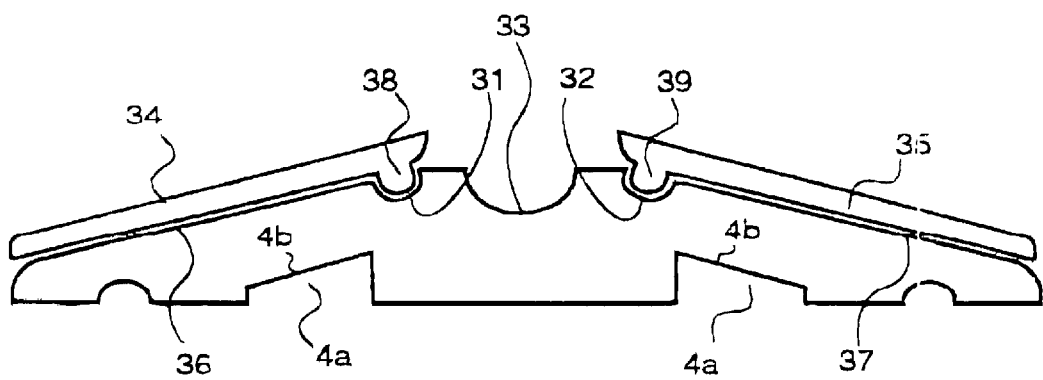
FIG. 3 shows, in part sectional side elevation, a second hollow, tubular enclosure for use in a pipe connector of the invention.

A further embodiment of a hollow, tubular enclosure is shown in FIG. 3, where means is provided for increasing the constraining force applied to the mechanical gripping means and sealing means by the hollow, tubular enclosure. In this embodiment, the enclosure body 30 is provided with depressions 31, 32 and 33 on its outer surface, which serve as locating points for compression members. Two such compression members 34 and 35 are illustrated. The compression members 34, 35 have inner conical surfaces which co-operate with the outer ramp surfaces 36, 37 of the enclosure body 30. The compression members 34, 35, are pushed up the ramp surfaces 36, 37 until projections 38, 39 on the compression members 34, 35, become seated in recesses 31, 32 of the enclosure body 30. The wedging action of the compression members 34, 35, increases the constraining force applied, by the enclosure body to the mechanical gripping means and the sealing means. If desired, a further compression means, for example a resilient split ring, can be applied to the enclosure body and seated in depression 33.

In other embodiments, the ramp surfaces 36, 37 of the enclosure body 30 could be provided with one or more axial slits which may assist radial deformation under the wedging action of the conical compression members 34, 35. Other compression members, for example, straps, bands and clips, which may be bolted or screwed together, may be used instead of the conical compression member 34, 35.

In FIG. 3 the recesses 4a are shown with frusto-conical inner surfaces 4b which co-operate with frusto-conical surfaces on the gripping segments (not shown) to improve axial strength.

Figure 4:
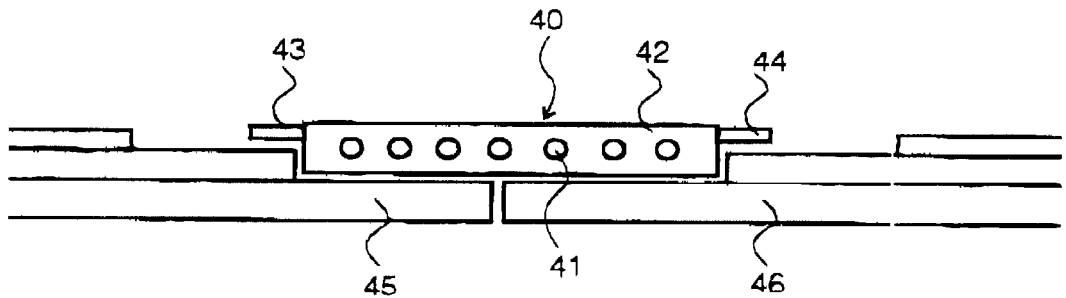
FIG. 4 shows an installed electrofusion coupler component, in part sectional side elevation, the coupler having projected terminals to provide electrical continuity across the joint.

In FIG. 4 there is illustrated a fusion coupler component of a pipe connector according to the invention, which is adapted to carry electrical continuity across the pipe connection. The fusion coupler 40 comprises an electrofusion coil 41 which is embedded in a layer of thermoplastic polymeric material 42, for example, polyethylene. At each end of the coil there is provided a terminal 43, 44 which projects naturally outboards into the space occupied by the segmented gripping ring (not shown).

Figure 5:
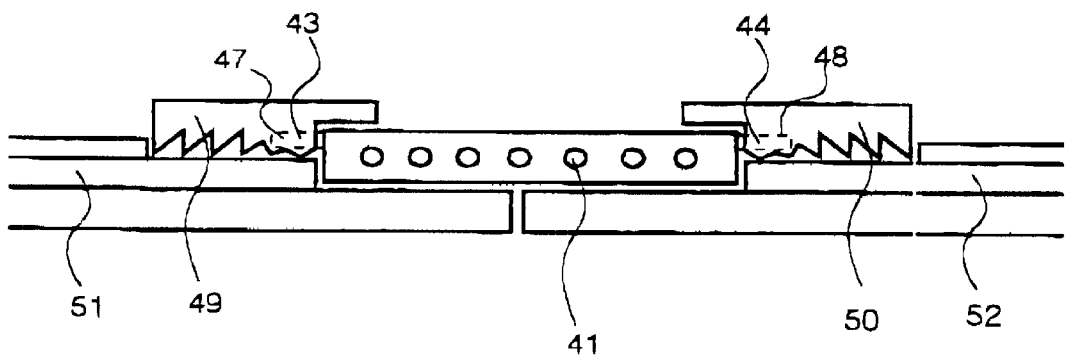
FIG. 5 shows the coupler of FIG. 4, again in part sectional side elevation, electrically connected to adjacent segments of a mechanical gripping means.

In use, the electrofusion coupler is first energised in order to fuse the coupler to the inner thermoplastic layers 45, 46 of the pipes to be joined. In the next stage, as shown in FIG. 5, the segmented gripper rings are installed, with the terminals 43, 44 inserted into sockets 47, 48 in gripper ring segments 49, 50. In this way, electrical continuity is maintained between metal layers 51, 52 of the composite pipes to be joined, via the segments 49, 50 and the fusion coil 41.

Figure 6:
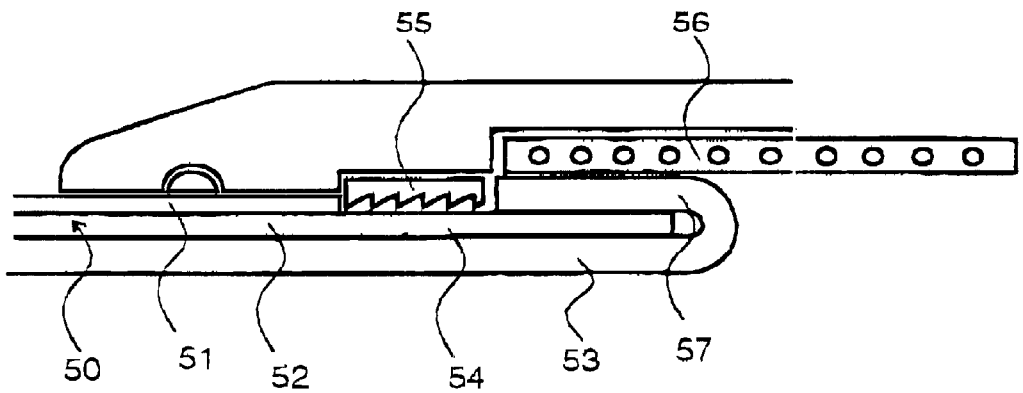
FIG. 6 shows a further embodiment of a pipe connector according the invention, in part sectional side elevation, wherein the inner thermoplastic layer of the composite pipe has been turned over and lies on top of the reinforcing layer.

FIGS. 6, 7, 8 and 9 show further embodiments of pipe connections according to the Invention, in whig the pipe 50 to be joined is first prepared by cutting back the outer protective layer 51 and the metal reinforcing layer 52, and folding back the thermoplastic layer 53 over the metal reinforcing layer 52. In FIG. 6, the folding back of the inner thermoplastic layer 53 still leaves exposed a section 54 of the metal reinforcing layer for connection with the segmented gripper ring 55. The electrofusion coupler 56 is disposed over the folded back section 57 of the inner thermoplastic layer 53 and is fused thereto as previously described.

In the embodiment of FIG. 7, the inner thermoplastic layer 53 is folded over the metal reinforcing layer 52 until it abuts the end of the outer protective layer 51. In this case the segmented gripper ring 58 is provided with sharp teeth 59, which are pressed by the constraining force of the enclosure body 60 through the outer protective layer 51 and into engagement with the metal reinforcing layer 52. This results in a slightly more compact structure than that shown in FIG. 6.

FIG. 8 shows a pipe connection similar to that of FIG. 7, but wherein the hollow, tubular enclosure 70 is formed from a pre-stressed, expanded polymeric material, or example, cross-linked polyethylene (PEX), which is first diametrically enlarged mechanically and supported on a split core supporting device 71. The enclosure 70 and core 71 are positioned over the gripper ring 58 and electrofusion coupler 56 and then the core 71 is removed. After removal of the core 71 the enclosure 70 shrinks with great force, and drives the teeth 59 of the gripper ring 58 through the outer protective layer 51 of the pipe and into engagement with the reinforcing layer 52.

FIG. 9 shows a pipe connector similar to that of FIG. 8, but wherein the electrofusion coupler 80 is T-shaped in cross-section, and where in the extension 31 is also provided with an electrofusion element 82 to fuse to the bent section 83 of the folded back thermoplastic layer 53 to lengthen the bond line and improve the seal.

What is claimed is:

1. A connector comprising:
   a hollow, tubular enclosure adapted to receive a multilayer composite pipe, the tubular enclosure comprising two or more co-operating hollow members, the hollow members being threaded to enable them to be screwed together, or the hollow members having co-operating annular projections or depressions enabling them to be snap-fit together;
   fusion means disposed within the enclosure and adapted to make a fusion connection with an inner thermoplastic layer of the pipe; and
   mechanical gripping means disposed within the enclosure and axially spaced from the fusion means, the gripping means being adapted to grip a reinforcing layer of the pipe in response to a radial constraining force applied by the enclosure.

2. A connector according to claim 1, further comprising sealing means disposed within the enclosure and adapted to form an environmental seal with an outer protective layer of the pipe, and wherein the enclosure is adapted, in use, to apply a constraining force to the sealing means.

3. A connector according to claim 2, in which the fusion means, mechanical gripping means and sealing means are axially spaced from one another such that the sealing means is nearest to an end of the tubular enclosure, the fusion means is nearest a center of the tubular enclosure, and the gripping means is between the sealing means and the fusion means.

4. A connector according to claim 1, in which the action of screwing or snap-fitting the two or more co-operating hollow members together acts to apply, or to increase, the constraining force e on the gripping means.

5. A connector according claim 1, further comprising compression members adapted to fit around the tubular enclosure, the compression members having conical surfaces that cooperate with corresponding ramp surfaces of the enclosure to apply radially inward forces on the mechanical gripping means.

6. A connector according to claim 1, in which the hollow, tubular enclosure comprises a composite construction, with plastic and reinforcement layer.

7. A connector according to claim 1, in which the fusion means comprises an electrical conductor element in thermal communication with a layer of fusible thermoplastic polymeric material.

8. A connector according to claim 1, in which the mechanical gripping means comprises a series of two or more toothed segments configured to be circumferentially disposed around the pipe, the toothed segments being provided with teeth, or with roughened surfaces that are capable of gripping the reinforcing layer of the composite pipe.

9. A connector according to claim 8, in which the teeth of the toothed segments are sufficiently sharp to be able to penetrate an outer protective layer of the composite pipe in order to grip the reinforcing layer.

10. A connector according to claim 1, in which the mechanical gripping means comprises a ring, or a series of arcuate segments, provided with helical threads that can be screwed onto the reinforcing layer of the pipe.

11. A connector according to claim 2, in which the sealing means comprises a sealing ring located in a recess in an inner surface of the tubular enclosure.

12. A connector according to claim 11, in which the sizes of the sealing ring and of the recess in the enclosure are arranged such that, in use, a constraining force applied by the enclosure forces the sealing ring into sealing contact with the outer surface of the outer protective layer of the composite pipe.

13. A connector according to claim 2, in which the sealing means comprises an adhesive sealing material.

14. A connector according to claim 13, in which the sealing material includes a constituent selected from the group consisting of a mastic, an adhesive elastomeric sealant, and a hot melt adhesive.

15. A connector according to claim 1, in which the enclosure is provided as two or more separate, individually installed components.

16. A connector according to claim 1, in which the thermoplastic layer and the reinforcing layer are integrated in a single layer.

17. A connector according to claim 1, wherein the gripping means and the fusion means are adapted to provide electrical continuity across the fusion connection.

18. A connector according to claim 1, in which the fusion means comprises an electrofusion coil in thermal communication with a layer of fusible thermoplastic polymeric material; the electrofusion coil being adapted to provide electrical continuity across the connection though connection with metal in the reinforcing layer.

19. A connector according to claim 18, further comprising a terminal in electrical communication with the electrofusion coil, the terminal being configured for connection, either directly or through the mechanical gripping means, to metal in the reinforcing layer.

20. A connector according to claim 18, in which the mechanical gripping means is a segmented mechanical gripping means, the connector further comprising:
 a terminal in electrical communication with an ends of the electrofusion coil, and
 a socket in an adjacent segment of the segmented mechanical gripping means, the socket being configured to receive the terminal.

21. A connector according to claim 17, in which electrical continuity is provided via a conductive material of the tubular enclosure.

22. A method of forming a connection to a multi-layer composite pipe, the pipe comprising at least one reinforcing layer, or layer of high axial strength, at least one inner thermoplastic layer and at least one outer protective layer, wherein at least the outer protective layer of the composite pipe is cut back in order that circumferential surfaces of the inner thermoplastic layer, and the reinforcing layer, or high axial strength layer, are exposed for connection by a connector comprising:
 (i) a hollow, tubular enclosure adapted to receive the pipe;
 (ii) fusion means adapted to make a fusion connection with the inner thermoplastic layer of the pipe; and,
 (iii) axially spaced from the fusion means, mechanical gripping means adapted to grip the reinforcing layer of the pipe;
the fusion means and mechanical gripping means being disposed within the enclosure and the enclosure being adapted, in use, to apply a constraining force to the mechanical gripping means, the axial strength of the joint being provided more by the mechanical gripping means than said fusion connection.

23. A method as claimed in claim 22 in which said thermoplastic layer and said reinforcing layer, or layer of high axial strength are separate, said reinforcing layer, or layer of high axial strength, also being cut back.

24. A method according to claim 23, wherein the lengths of the inner thermoplastic layer and the reinforcing layer, or high axial strength layer, exposed for connection are from 20 to 200% of OD, where OD is the outer diameter of the pipe.

25. A method according to claim 23, in which, in preparing the pipe for connection, an upstanding projection at the cut-back edge of the reinforcing layer is provided.

26. A method according to claim 23, in which a section of the inner thermoplastic layer is turned over so that it lies on top of and overlaps the reinforcing layer for a short distance at the end of the pipe.

27. A method as claimed in claim 22, in which the tubular enclosure is formed from an expanded cross-linked polymeric material which is "held-out" on a removable core, which core is removed after the fusion means, mechanical gripping means and sealing means (when present) have been positioned on the pipe such that the tubular enclosure contracts radially to engage the gripping means and sealing means, when present, with the reinforcing layer, or layer of high axial strength, and protective layer respectively.

28. A connector comprising:
 a hollow, tubular enclosure adapted to receive a multi-layer composite pipe, the tubular enclosure comprising two or more co-operating hollow members;
 fusion means disposed within the enclosure and adapted to make a fusion connection with an inner thermoplastic layer of the pipe;
 mechanical gripping means disposed within the enclosure and axially spaced from the fusion means, the gripping, means being adapted to grip a reinforcing layer of the pipe in response to a radial constraining force applied by the enclosure; and
 compression members adapted to fit around the tubular enclosure, the compression members having conical surfaces that cooperate with corresponding ramp surfaces of the enclosure to apply radially inward forces on the mechanical gripping means.

29. A connector comprising:

a hollow, tubular enclosure adapted to receive a multilayer composite pipe;

fusion means disposed within the enclosure and adapted to make a fusion connection with an inner thermoplastic layer of the pipe; and mechanical gripping means having a ring, or a series of arcuate segments, provided with helical threads that can be screwed onto a reinforcing layer of a pipe disposed within the enclosure, the mechanical gripping means being axially spaced from the fusion means and being adapted to grip the reinforcing layer of the pipe in response to a radial constraining force applied by the enclosure.

30. A connector comprising:

a hollow, tubular enclosure adapted to receive a multilayer composite pipe;

sealing means including an adhesive sealing material, the sealing means being disposed within the enclosure and adapted to form an environmental seal with an outer protective layer of the pipe, and wherein the enclosure is adapted, in use, to apply a constraining force to the sealing means;

fusion means disposed within the enclosure and adapted to make a fusion connection with an inner thermoplastic layer of the pipe; and mechanical gripping means disposed within the enclosure and axially spaced from the fusion means, the gripping means being adapted to grip a reinforcing layer of the pipe in response to a radial constraining force applied by the enclosure.

31. The connector of claim 30, wherein the sealing material includes a constituent selected from the group consisting of a mastic, an adhesive elastomeric sealant, and a hot melt adhesive.

32. A connector comprising:

a hollow, tubular enclosure adapted to receive a multilayer composite pipe;

fusion means disposed within the enclosure and adapted to make a fusion connection with an inner thermoplastic layer of the pipe; and mechanical gripping means disposed within the enclosure and axially spaced from the fusion means, the gripping means being adapted to grip a reinforcing layer of the pipe in response to a radial constraining force applied by the enclosure, the reinforcing layer and the thermoplastic layer being integrated into a single layer.

33. A connector comprising:

a hollow, tubular enclosure adapted to receive a multilayer composite pipe;

fusion means disposed within the enclosure and adapted to make a fusion connection with an inner thermoplastic layer of the pipe; and mechanical gripping means disposed within the enclosure and axially spaced from the fusion means, the gripping means being adapted to grip a reinforcing layer of the pipe in response to a radial constraining force applied by the enclosure, the gripping means and the fusion means being adapted to provide electrical continuity across the fusion connection.

34. A connector comprising:

a hollow, tubular enclosure adapted to receive a multilayer composite pipe;

fusion means disposed within the enclosure and adapted to make a fusion connection with an inner thermoplastic layer of the pipe, the fusion means including an electrofusion-coil in thermal communication with a layer of fusible thermoplastic polymeric material, the electrofusion coil being adapted to provide electrical continuity across the connection through connection with metal in the a reinforcing layer of the pipe; and mechanical gripping means disposed within the enclosure and axially spaced from the fusion means, the gripping means being adapted to grip the reinforcing layer of the pipe in response to a radial constraining force applied by the enclosure.

* * * * *